Jan. 1, 1974   P. A. DILLARD ET AL   3,783,029
SELF-ERECTING AND RIGIDIZING DEPLOYABLE PANEL AND PANEL ASSEMBLY
Filed Sept. 21, 1970                                    3 Sheets-Sheet 2
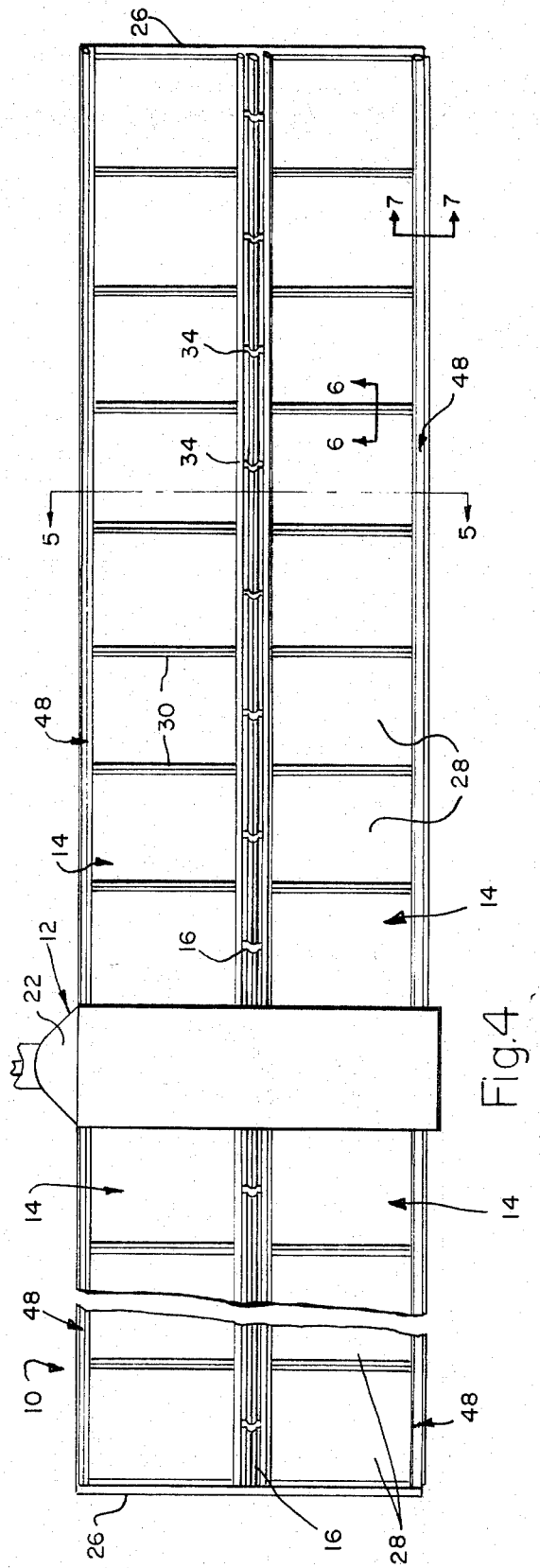
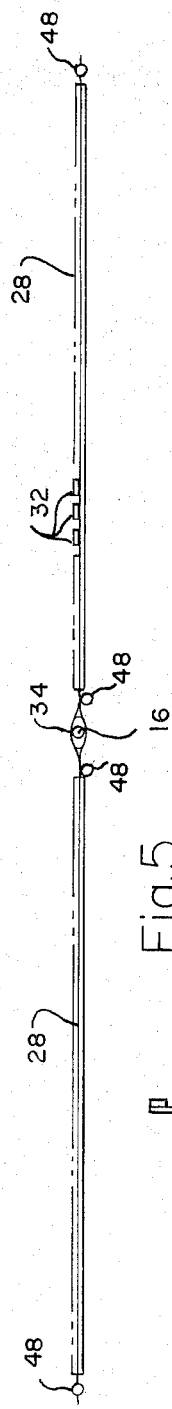
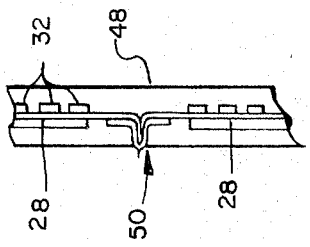
Paul A. Dillard
Clyde E. Williamson
INVENTORS
BY
ATTORNEY

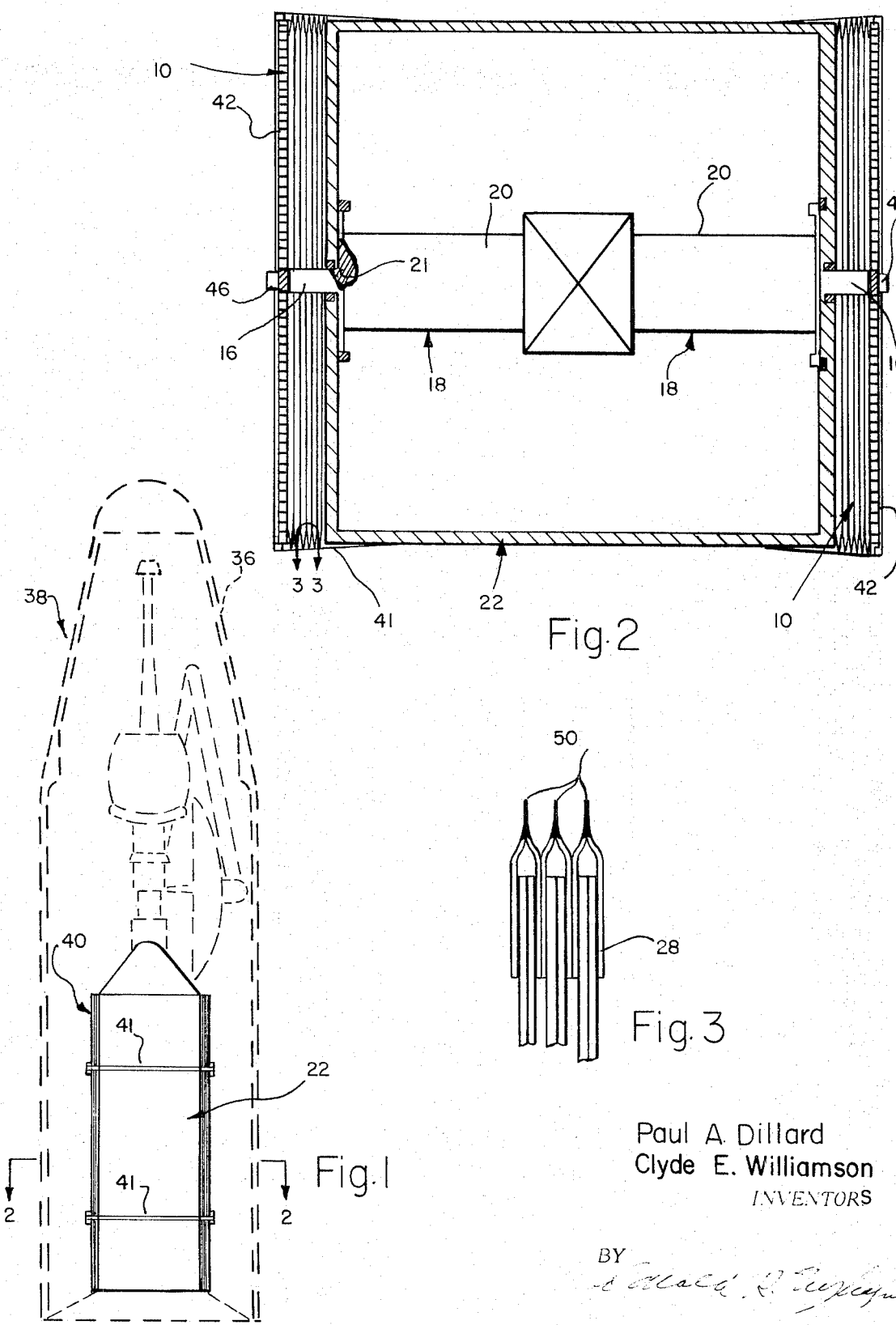

United States Patent Office 3,783,029
Patented Jan. 1, 1974

3,783,029
SELF-ERECTING AND RIGIDIZING DEPLOYABLE PANEL AND PANEL ASSEMBLY
Paul A. Dillard, Littleton, Colo., and Clyde E. Williamson, Los Angeles, Calif., assignors to TRW Inc., Redondo Beach, Calif.
Filed Sept. 21, 1970, Ser. No. 73,732
Int. Cl. H01l 15/02
U.S. Cl. 136—89          14 Claims

ABSTRACT OF THE DISCLOSURE

A deployable panel for deployable solar arrays and other deployable structures. The panel has a number of panel sections hinged edge-to-edge along hinge lines normal to the longitudinal panel edges and thin walled resilient tubular beams secured to the panels along edges of the panel sections. The panel is foldable to a compact stowage configuration wherein the panel sections are disposed in confronting face-to-face relation with the beams folded and flattened, such that the beams store elastic strain energy for aiding extension of the panel to a generally flat unfolded configuration wherein the beams rigidize the panel. The beams may provide electrical bus conductors for electrical elements, such as solar cells, on the panel.

A deployable panel structure embodying a pair of the panels and an intervening deployment boom for extending the panels from folded to unfolded configuration.

BACKGROUND OF THE INVENTION

(1) Field of the invention

This invention relates generally to deployable structures for spacecraft and the like. More particularly, the invention relates to a folding deployable panel for deployable solar arrays and other deployable structures and to a single boom deployable panel structure embodying the folding panel.

(2) Prior art

As will appear from the ensuing description, the deployable panel and panel structure of the invention may be utilized for various purposes such as antennas, solar arrays, and others. The invention will be disclosed in connection with a solar array.

Deployable solar arrays of the class to which this invention pertains have a deployment boom mechanism mounted on a supporting structure, such as a spacecraft, and a folding solar panel attached to the boom mechanism for extension with the latter from a compact stowed configuration to a flat deployed configuration. The solar panel has a number of panel sections joined edge-to-edge along interconnecting hinge lines. In stowed configuration, the deployment boom is retracted to the supporting structure, and the solar panel is folded accordian-fashion with the panel sections disposed in confronting face-to-face relation flat against the structure. During deployment, the boom is extended outwardly from the supporting structure to a deployed position wherein the solar panel sections are disposed substantially in a common plane.

SUMMARY OF THE INVENTION

The present invention provides an improved deployable folding panel and deployable panel structure embodying the panel. One important aspect of the invention is concerned with erection of the panel to and rigidizing of the panel in its deployed configuration. According to this aspect, thin-walled resiliently yieldable tubular beams are secured to the panel along edges of the panel sections. When the panel is folded to its stowed configuration, these beams are folded and flattened in a manner such that the beams are stressed to store elastic strain energy. When the panel is released for deployment, this elastic strain energy in the boom aids unfolding of the panel to its generally planar deployed configuration. The beams also rigidize the panel in its deployed configuration. According to a feature of the invention, the beams may provide bus conductors for electrical elements, such as solar cells, on the panel.

Another aspect of the invention is concerned with a deployable panel structure utilizing the folding panel. This structure embodies a pair of the folding panels and a single intervening deployment boom mounted on a support, such as a spacecraft, and attached to the panels. The boom is retractable to the support to locate the two panels in folded configuration flat against the side of the support. The boom is extendable outwardly from the support to unfold the panels to their deployed configurations. The tubular beams of the panels aid in this deployment of the panels and rigidize the panels in their deployed configuration.

BRIEF DESCRIPTION OF THE DRAWINGS

In the drawings:

FIG. 1 illustrates a spacecraft equipped with a pair of the present deployable panel structures which, in this instance, are solar arrays shown in stowed configuration;

FIG. 2 is an enlarged section taken on line 2—2 in FIG. 1;

FIG. 3 is an enlargement of the area enclosed by the circular arrow 3 in FIG. 2;

FIG. 4 illustrates the solar arrays deployed from the spacecraft;

FIG. 5 is a section taken on line 5—5 in FIG. 4;

FIG. 6 is a section taken on line 6—6 in FIG. 4; and

FIG. 7 is an enlarged section taken on line 7—7 in FIG. 4.

DESCRIPTION OF THE PREFERRED EMBODIMENTS

The drawings illustrate a pair of solar arrays 10 according to the invention mounted on a support 12 which, in this instance, is a spacecraft. The two arrays are identical and are located at opposite sides of the spacecraft for outward extension from their stowed configurations of FIG. 1 to their deployed configurations of FIG. 4.

Each solar array 10 has a pair of folding solar panels 14 and an intervening deployment boom 16. Deployment boom 16 is the extendable member of so-called linear extender 18 which includes, in addition, an actuator 20. Linear extenders of this kind are well-known in the art (see Pat. No. 3,532,299) and hence need not be described in detail. Suffice it to say that the extender boom 16 comprises a strip of spring metal which is wound in flat condition on a motor driven reel (not shown) within the actuator 20 and is stressed to curl laterally into a tubular configuration as it leaves the reel. The boom exits from the actuator through a guide 21 which is sized to slidably receive the boom in its tubular configuration. The actuator motor is reversible to drive the actuator reel in either direction to extend the boom from or retract the boom into the actuator. In the particular inventive embodiment illustrated, the actuators 20 of the two solar arrays 10 are coaxially mounted within the body 22 of the spacecraft 12 for extension of their booms 16 on a common axis beyond opposite sides of the body.

Attached to the outer end of each deployment boom 16 is a cross-member 26 extending parallel to the longitudinal axis of the spacecraft 12. Where the deployment boom is retracted, this cross-member is located close to the adjacent side of the spacecraft body 22.

Each solar panel 14 has a number of rectangular panel sections 28 joined edge-to-edge by intervening hinge means 30. The hinging axes of these hinge means parallel one another and extend normal to the deployment axis of the respective boom 16. Each panel section 28 comprises a substrate which is preferably a thin-film substrate of Mylar, Kapton, or other suitable plastic mounting solar cells 32. The inner and outer panel sections 28 of each solar panel 14 are attached to the spacecraft 12 and to the boom cross-member 26 by hinge means having hinging axes parallel to the hinging axes of hinge means 30. Formed integrally with the substrate of each panel section and projecting from the inner longitudinal edge of the substrate, along the center line of the panel section, is an apertured tab 34 which slides on the deployment boom 16.

During launch, the solar arrays 10 are retracted to their stowage configuration of FIGS. 1 through 3. In this configuration, the deployment booms 16 are retracted into their actuators 20. The solar panels 14 are folded accordian-fashion with the panel sections 28 disposed in confronting face-to-face relation flat against the adjacent sides of the spacecraft 12 so as to permit containment of the spacecraft and solar arrays within the shroud 36 of the launch vehicle 38. The solar cells 32 on the panel sections are then disposed in face-to-face relation. Releasible retaining means 40 are provided for releasibly securing the solar panels in their stowed configuration and loading the folded panel sections to prevent vibration of the sections and their facing solar cells 32. This loading on the folded solar panels permits face-to-face contact of the solar cells without damage to the cells due to vibration during launch.

The particular retaining means 40 shown comprise retaining panels 42 seating against the outer folded panel sections 28 and retaining bands 41 encircling the spacecraft 12 and retaining panels. When the solar arrays are stowed, the retaining panels occupy their solid line positions with their inner edges engaging under flanges on the deployment boom cross-members 26 which retain the panels in loading engagement with the folded solar panels 14.

After orbit is achieved, the shroud 36 of the launch vehicle 38 is separated from the spacecraft 12. The retaining bands 41 are then severed by pyrotechnic shear devices 46 and the deployment booms 16 are extended to their positions of FIG. 4. This deployment of the booms releases the retaining panels 42 and effects unfolding of the solar panels 14 to their deployed configuration of FIG. 4. In this deployed configuration, the panel sections 28 of each solar array are disposed substantially in a common plane containing the respective deployment boom 16.

According to an important feature of the invention, relatively thin-walled resiliently flexible tubular beams 48 are provided along the longitudinal edges of the solar panels 14. These beams may be constructed of a plastic material, such as Mylar or Kapton, or a metallic material, such as beryllium copper, which is elastically yieldable such that each beam may be folded and compressed to store in the beam elastic strain energy for restoring the beam to its normal tubular shape when released. As shown in FIG. 5, each beam 48 has facing generally semi-cylindrical wall portions 48a and diametrically opposed outwardly directed flanges 48b disposed in a common diametrical plane passing between the wall portions. The beams are secured along their flanges 48b to the marginal edges of the solar panel section substrates.

When the solar arrays 10 are retracted to their stowed configuration of FIG. 2, the beams 48 are folded at the hinge lines of the solar panel sections 28 and compressed or flattened, such that elastic strain energy is stored in the beams. When the booms 16 are extended, this elastic strain energy restores the beams to their normal tubular shape and thereby aids in unfolding the solar panels 14 as the booms deploy.

When the panels 14 are fully deployed, the beams 48 assume their normal tubular shape to provide stiffening or rigidizing beams along the longitudinal edges of the solar panels. In the particular embodiment shown, the beams extend to full length of the longitudinal solar panel edges and across the panel hinge lines to rigidize the panel against folding on these lines. If desired, the beams may be constructed in sections which are hinged on the hinge lines of the solar panel sections 28 to permit retraction of the solar arrays 10 in orbit.

The particular solar array panels 14 shown have spring clips 50 secured to the panel sections 28 along their hinge lines. These clips are stressed to normally assume their shapes of FIG. 6. Accordingly, when the solar arrays are retracted, the clips store elastic strain energy which aids unfolding of the solar panels on their hinge lines. The beams and clips may be designed to have sufficient strain energy when folded to deploy the solar panels. In this event, the deployment booms serve merely to guide and control the rate of deployment and may even be dispensed with. While the illustrated solar panels have rigidizing beams only along their longitudinal edges, additional beams may be secured along the panel hinge lines.

According to a feature of the invention, the solar panel self-erecting and rigidizing beams 48 may provide electrical bus connectors between the spacecraft 12 and the the beams of metal or securing bus conductors to the solar cells 32. This may be accomplished by constructing

What is claimed as new in support of Letters Patent is:

1. A deployable solar panel comprising:
   a number of rectangular panel sections mounting solar cells and hinged edge-to-edge on parallel hinge lines normal to the longitudinal panel edges such that said panel is contractable to a folded configuration wherein said panel sections are disposed in confronting face-to-face relation and said panel is extendable to an unfolded configuration wherein said panel sections are disposed in substantially coplanar relation;
   relatively thin-walled resiliently flexible tubular beams having longitudinal flanges secured to the longitudinal panel edges in a manner such that said beams are folded and flattened in said folded configuration of said panel; and
   said beams in their folded and flattened configuration storing elastic strain energy which restores said beams to their normal tubular configuration to rigidize said panel sections when said panel is extended to its unfolded configuration.

2. A panel according to claim 1 wherein:
   said beams extend the full length of said longitudinal panel edges and across said hinge lines, whereby the strain energy in said beams in their folded and flattened configuration aids extension of said panel to its unfolded configuration and stiffens both longitudinally and transversely.

3. A panel according to claim 1 including:
   spring clips secured to said panel sections along said hinge lines which, in said folded configuration of said panel, are stressed to store elastic strain energy for aiding extension of said panel to said unfolded configuration.

4. A panel according to claim 1 wherein:
   each beam comprises a pair of coplanar diametrically opposed outwardly directed flanges in a diametrical plane of the beam; and
   one flange of each beam is joined to the adjacent edge of said panel.

5. A panel according to claim 1 wherein each panel section comprises a thin-film substrate.

6. A panel according to claim 1 wherein said beams provide electrical bus conductors for said cells.

7. A panel according to claim 1 wherein:
   each beam comprises a pair of diametrically opposed outwardly directed flanges in a diametrical plane of the beam;

one flange of each beam is joined to the adjacent edge of said panel;

said beams provide electrical bus conductors for said cells; and said beams extend the full length of said longitudinal panel edges and across said hinge lines, whereby the strain energy in said beams in their folded and flattened configuration aids extension of said panel to its unfolded configuration.

8. A deployable solar panel structure comprising:

a support;

a deployment mechanism on said support including a deployment boom having an outer end and movable longitudinally between a retracted position wherein said outer end is located adjacent said support and an extended position wherein said boom projects beyond one side of said support;

at least one folding panel including a number of rectangular panel sections mounting solar cells and joined edge-to-edge along parallel hinge lines normal to said boom;

the ends of said panel being joined to said support and outer boom end, respectively, along hinge lines parallel to said first mentioned hinge lines, such that said panel is retractable with said boom to a folded configuration wherein said panel sections are folded accordion fashion into confronting face-to-face relation against said support, and said panel is extendable with said boom to a deployed configuration wherein said panel sections are disposed substantially in a common plane containing said boom;

means slidably supporting said panel sections on said boom in such a way as to permit folding and unfolding rotation of said sections relative to said boom during extension and retraction;

relatively thin-walled resiliently flexible tubular beams secured to the longitudinal panel edges in a manner such that said beams are folded and flattened in said folded configuration of said panel; and said beams in their folded and flattened configuration storing elastic strain energy which restores said beams to their normal tubular configuration to rigidize said panel when said panel is extended to its unfolded configuration.

9. A deployable panel structure according to claim 8 wherein:

said beams extend the full length of said longitudinal panel edges and across said hinge lines, whereby the strain energy in said beams in their folded and flattened configuration aids extension of said panel to its unfolded configuration.

10. A deployable panel structure according to claim 8 including:

spring clips secured to said panel sections along said hinge lines which, in said folded configuration of said panels, are stressed to store elastic strain energy for aiding extension of said panels to said unfolded configuration.

11. A deployable panel structure according to claim 8 whereinn each beam has a longitudinal flange joined to the adjacent edge of said panel.

12. A deployable panel structure according to claim 8 wherein each panel section comprises a thin-film substrate.

13. A deployable panel structure according to claim 8 wherein said beams provide electrical bus conductors for said solar cells.

14. A deployable panel structure according to claim 8 wherein:

each beam comprises a pair of coplanar diametrically opposed outwardly directed flanges in a diametrical plane of the beam;

one flange of each beam is joined to the adjacent edge of said panel;

said beams provide electrical bus conductors for said cells; and said beams extend the full length of said longitudinal panel edges and across said hinge lines, whereby the strain energy in said beams in their folded and flattened configuration aids extension of said panel to its unfolded configuration.

References Cited

UNITED STATES PATENTS

| 3,532,299 | 10/1970 | Williamson et al. | 136—89 X |
| 3,473,758 | 10/1969 | Webb | 136—89 X |
| 3,295,556 | 1/1967 | Gertsma et al. | 52—108 U X |

ALLEN B. CURTIS, Primary Examiner

U.S. Cl. X.R.

52—108